United States Patent
Bossmann et al.

(10) Patent No.: US 8,252,601 B2
(45) Date of Patent: Aug. 28, 2012

(54) METHOD FOR DESIGNATING A COMPONENT HAVING A HEAT INSULATION LAYER AND FOR DETERMINING ITS OPERATING TIME

(75) Inventors: Hans-Peter Bossmann, Lauchringen (DE); Dietrich Eckardt, Ennetbaden (CH)

(73) Assignee: ALSTOM Technology Ltd., Baden (CH)

( * ) Notice: Subject to any disclaimer, the term of this patent is extended or adjusted under 35 U.S.C. 154(b) by 713 days.

(21) Appl. No.: 12/197,742

(22) Filed: Aug. 25, 2008

(65) Prior Publication Data
US 2009/0061530 A1  Mar. 5, 2009

(30) Foreign Application Priority Data
Aug. 31, 2007  (CH) ...................... 1363/07

(51) Int. Cl.
*G01N 21/00* (2006.01)

(52) U.S. Cl. ......... 436/164; 436/2; 427/226; 427/383.1; 427/404; 427/419.1

(58) Field of Classification Search ........................ None
See application file for complete search history.

(56) References Cited

U.S. PATENT DOCUMENTS

| | | | |
|---|---|---|---|
| 2002/0172838 A1* | 11/2002 | Rigney et al. | 428/633 |
| 2004/0082069 A1 | 4/2004 | Jiang et al. | |
| 2005/0003097 A1 | 1/2005 | Philip et al. | |
| 2008/0113095 A1* | 5/2008 | Gorman et al. | 427/226 |

FOREIGN PATENT DOCUMENTS

| | | |
|---|---|---|
| DE | 19733700 A1 | 4/1998 |
| DE | 102005051470 A1 | 4/2007 |
| EP | 1426760 A1 | 6/2004 |

\* cited by examiner

*Primary Examiner* — Yelena G Gakh
*Assistant Examiner* — Robert Xu
(74) *Attorney, Agent, or Firm* — Volpe and Koenig, P.C.

(57) ABSTRACT

A method for designating a component, coated with a heat insulation layer including zirconium dioxide ($ZrO_2$) stabilized with yttrium oxide ($Y_2O_3$) [YSZ], and for determining its operating time or operating temperature is provided. The method includes doping the heat insulation layer and marking the doped heat insulation layer, with at least one metal oxide in at least one surface region of the component. The metal oxide is selected such that the doped region of YSZ is visible or can be made optically visible in order to designate the component. The method also includes comparing a slower or faster change in lattice parameters of the doped YSZ region, as compared with undoped YSZ, and determining the operating time of the component under temperature by comparing the lattice parameters with a known calibrating characteristic curve.

12 Claims, 2 Drawing Sheets

METHOD FOR DESIGNATING A COMPONENT HAVING A HEAT INSULATION LAYER AND FOR DETERMINING ITS OPERATING TIME

FIELD OF INVENTION

The invention relates to a method for designating a component coated with a heat insulation layer consisting of zirconium dioxide ($ZrO_2$) stabilized with yttrium oxide ($Y_2O_3$) [YSZ] and for determining its operating time or operating temperature.

BACKGROUND

In stationary gas turbines and gas turbines of aircraft engines, components coated with a heat insulation layer or TBC (thermal barrier coating) are employed. Components of this type are mostly cooled from inside or from one side and are heat-insulated on the hot side by a ceramic TBC layer. A low thermal conductivity is advantageous in respect of the required cooling air and thickness of the TBC layer. The ceramic TBC layer consists, for example, of zirconium dioxide stabilized with yttrium oxide (YSZ) or of other ceramic materials and stabilizers and can be applied, with or without an adhesion promoter layer, to the surface of metallic substrates by various methods, such as, for example, air plasma spray (APS), electron beam physical vapor deposition (EB-PVD), etc.

Components of gas turbines are often exposed to extreme cyclic alternating thermal stresses. During the heating and the cooling of the components, thermal stresses arise due to different coefficients of thermal expansion of the various materials and they can lead to the material structure being damaged or failing. During operation, the components age as a function of the thermal load upon the component and, after a certain operating time under temperature, are reconditioned or scrapped. In reconditioning, typically, the TBC coating and an adhesion promoter layer which is present, if appropriate, are removed. Subsequently, after further work steps, such as the pretreatment of the metal substrate and the application of a new adhesion promoter layer (bond coat), the component is coated with a new heat insulation layer again and put to use.

Reconditionability is determined by the component boundary conditions, such as, for example, the operating time under high temperature, the manufacturer of the coating and the coating quality. Since, conventionally, commercially available YSZ (Yttria-Stabilized Zirconia) is applied to the component surfaces to be coated, using standard coating methods, components with renewed heat insulation layers do not generally make it possible to draw conclusions as to the manufacturer of the coating, the relevant process parameters and the material quality. Experience shows that, even with the same initial material for the YSZ coating, considerable differences arise with regard to the useful life of TBCs. Moreover, if the boundary conditions predetermined by the coating and the operation of the component are not known, the risk of a misjudgment of the component state increases.

Dopings of YSZ coatings are known per se and are used for various purposes, such as, for example, an infiltration of $Cr_2O_3$ as corrosion protection, or dopings with $Sc_2O_3$, $Yb_2O_3$, $Nd_2O_3$, $Sm_2O_3$, $Gd_2O_3$, NiO and $Cr_2O_3$ for reducing the thermal conductivity of heat insulation layers.

A stabilized $ZrO_2$ ceramic reinforced with hard material, having mechanical stability under hydrothermal stress, is known from DE-A-197 33 700. The $ZrO_2$ ceramic contains, in addition to a hard material component (for example TiC), $Al_2O_3$ and, as a remainder, a stabilized $ZrO_2$ phase with a solid solution of $Y_2O_3$ and $CeO_2$. To produce the $ZrO_2$ ceramic, a $ZrO_2$ powder containing $Y_2O_3$ is provided with a Cer doping and is then mix-ground together with the hard material component and with $Al_2O_3$ in a liquid.

SUMMARY

The present invention relates to a method for designating a component, coated with a heat insulation layer including zirconium dioxide ($ZrO_2$) stabilized with yttrium oxide ($Y_2O_3$) [YSZ], and for determining its operating time or operating temperature. The method includes doping the heat insulation layer and marking the doped heat insulation layer, with at least one metal oxide in at least one surface region of the component. The metal oxide is selected such that the doped region of YSZ is visible or can be made optically visible in order to designate the component. The method also includes comparing a slower or faster change in lattice parameters of the doped YSZ region, as compared with undoped YSZ, and determining the operating time of the component under temperature by comparing the lattice parameters with a known calibrating characteristic curve.

BRIEF DESCRIPTION OF THE DRAWINGS

Further advantages, features and details of the invention will be gathered from the following description of preferred exemplary embodiments and with reference to the drawing in which.

DETAILED DESCRIPTION OF THE PREFERRED EMBODIMENTS

Introduction to the Embodiments

Figure 1:
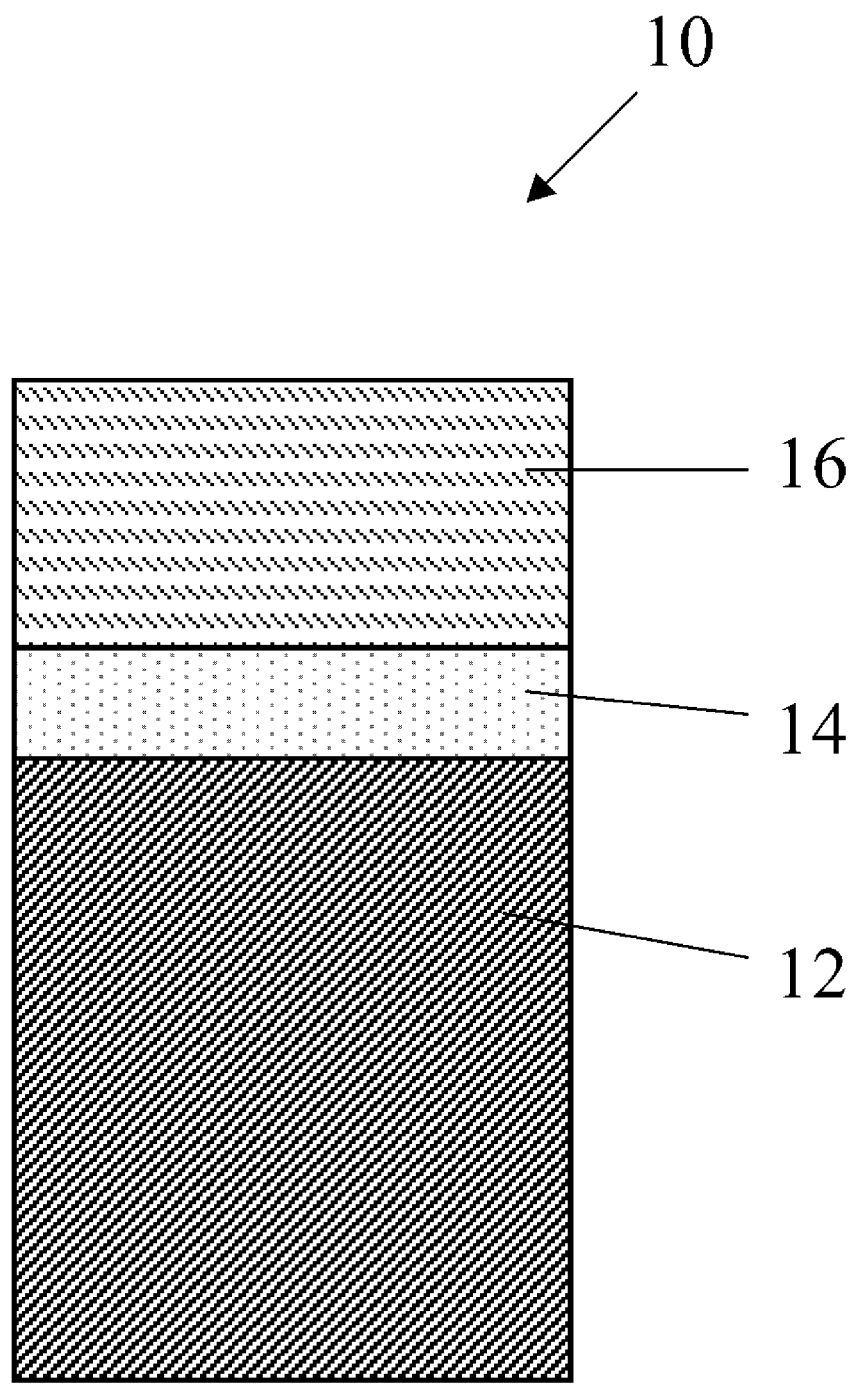
FIG. 1 shows a cross section through a coating of a thermally stressed component.

The object on which the invention is based is to specify a method of the type initially mentioned, which allows a simple identification of the manufacturer of the coating and by which, at the same time, the operating time of the coated components under high temperature can be reliably determined. Components coated with a heat insulation layer for high temperature applications are, in particular, components used in stationary gas turbines and in gas turbines of aircraft engines, such as, for example, guide vanes or rotor blades or liners in a combustion chamber.

In the solution according to the invention for achieving the object, the heat insulation layer is doped, for marking, with at least one metal oxide in at least one surface region of the component, the metal oxide being selected such that the doped region of YSZ

- is visible or can be made optically visible in order to designate the component, and
- to determine the operating time of the component under temperature, a slower or faster change in the lattice parameters of YSZ, as compared with undoped YSZ, is brought about, and the operating time under temperature is determined by comparing the lattice parameters with a known calibrating characteristic curve.

In a preferred version of the method according to the invention, the YSZ ceramic layer is doped with a mixture of appropriately selected metal oxides for the simultaneous designation of the component and determination of the operating time of the component under temperature.

The heat insulation layer may be colored locally by doping with a suitable metal oxide in order to make the designation of the component visible. A coloring metal oxide preferred for coloring is hematite ($Fe_2O_3$). If metal oxides without a natural color are used, the designation is made visible by technical aids, for example IR light, UV light or X-ray diffraction.

It may be advantageous, depending on the magnitude of the operating temperature and on the operating times to be expected, to adapt the changes in the lattice parameters of the doped YSZ correspondingly. The heat insulation layer is doped overall, that is to say over the entire component surface, or at selected points, in such a way that, on account of the operating time under high temperature, a faster or slower change in the lattice parameters of the doped YSZ crystal phases occurs, as compared with the undoped YSZ crystal phases.

For a faster change in the lattice parameters of the doped YSZ, as compared with undoped YSZ, the heat insulation layer is preferably doped with at least one alkaline-earth metal oxide, in particular with magnesium oxide (MgO) and/or calcium oxide (CaO).

For a slower change in the lattice parameters of the doped YSZ, as compared with undoped YSZ, the heat insulation layer is preferably doped with at least one rare-earth metal oxide, in particular with ytterbium oxide ($Yb_2O_3$) and/or gadolinium oxide ($Gd_2O_3$).

To characterize the component without a change in the lattice parameters of YSZ, as compared with undoped YSZ, the heat insulation layer is doped with at least one metal oxide stable under high temperature, in particular with one or more metal oxides selected from the group consisting of $Fe_2O_3$, $Cr_2O_3$, $Al_2O_3$, NiO and CoO. In addition, the heat insulation layer may be doped with a high-melting oxidation-resistant metal, in particular with platinum (Pt) and/or rhenium (Re).

The sum of the concentrations of all the dopings is preferably 0.0001 to 5% by weight, in particular 0.01 to 2% by weight.

The dopings may be limited locally and be formed as a pattern, for example to designate a specific manufacturer of the heat insulation layer in the form of a logo.

The dopings may be added to the initial material for the heat insulation layer, may take place by infiltration or may be generated by a conversion reaction within the heat insulation layer.

Doping with metal oxides stable under high temperature leads to no variation in the change in lattice parameters, as compared with the undoped YSZ crystal phases. However, the lattice parameters of the metal oxides stable under high temperature are characteristic of the operating time of the component under temperature, but the mixture ratio of the dopings in the YSZ crystal phases changes in a way characteristic of the component. Since the metal oxides stable under high temperature which are used for the dopings can be distinguished clearly from the deposits which are customary in gas turbines, the mixture ratio changing in time on account of the operating time under temperature can be determined by metallographic analysis methods, such as, for example, X-ray diffraction or emission spectroscopy, thus making it possible to draw conclusions as to the operating time of the component under temperature.

DETAILED DESCRIPTION

The set-up of a component 10, for example a turbine blade, is reproduced by way of example in FIG. 1. An adhesion promoter layer 14 consisting of an MCrAlY alloy (M=Fe, Co, Ni) is applied to a substrate 12 consisting of a nickel-based superalloy. The adhesion promoter layer 14 serves mainly for protecting the substrate 12 against oxidation and for better adhesion of a YSZ ceramic layer applied, for example, as a heat insulation layer 16 to the substrate 12 by plasma spraying and doped with metal oxides or with a high-melting oxidation-resistant metal. Alternatively, an aluminide layer may also be used as adhesion promoter layer. This may be generated by the diffusion of aluminum into the substrate surface.

Figure 2:
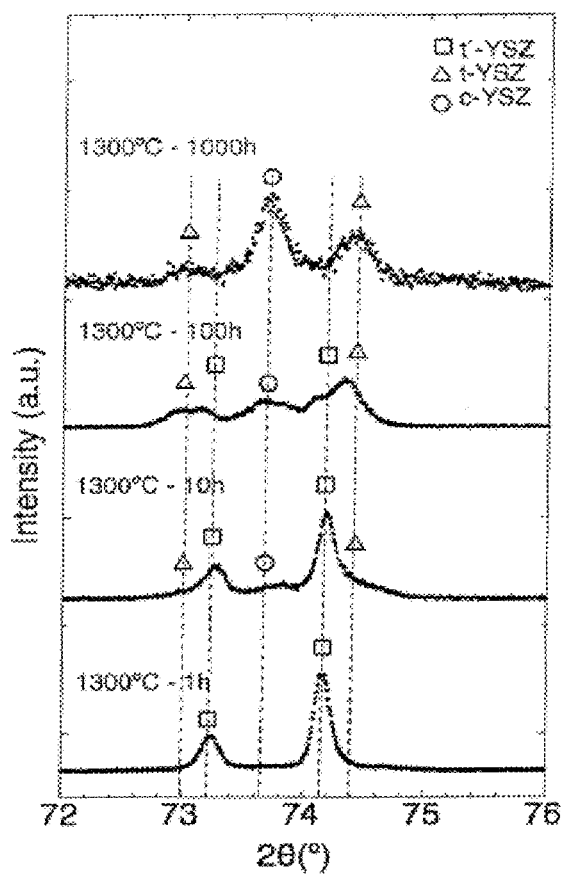
FIG. 2 shows an X-ray diffraction spectrum of the lattice parameters of YSZ after different times under a temperature of 1300° C.

FIG. 2 shows an X-ray diffraction spectrum of the lattice parameters of the t-, t'- and c-phases of YSZ after various operating times under a temperature of 1300° C. The time change in the lattice parameters which is dependent on the operating time under the temperature of 1300° C. can be seen clearly. A doping of YSZ with CaO or MgO leads to a faster variation of the lattice parameters and a doping with $Yb_2O_3$ or $Gd_2O_3$ leads to a slower variation of the lattice parameters as compared with undoped YSZ (not illustrated in the drawing).

Figure 3:
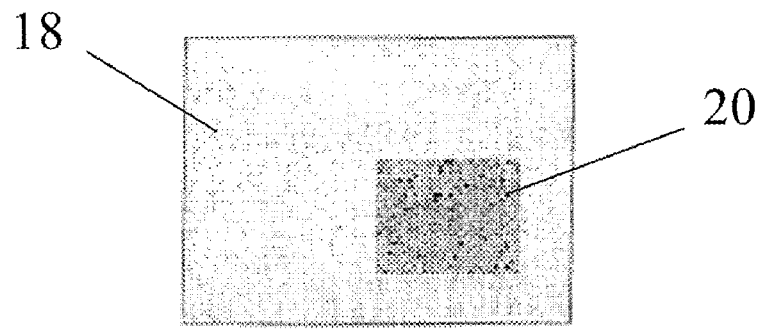
FIG. 3 shows a top view of the surface of an YSZ coating with a doped region.

FIG. 3 shows a surface of a coating consisting of undoped YSZ as a light area 18 with a small detail of a dark area 20. The dark area 20 arose due to the doping of YSZ by the infiltration of a mixture of CaO, $MgAl_2O_4$ (spinel) and $Fe_2O_3$ (hematite). The dark area 20 corresponds to a brownish coloring caused by hematite.

LIST OF REFERENCE SYMBOLS

10 Component
12 Substrate
14 Adhesion promoter layer
16 Heat insulation layer
18 Surface of a YSZ coating
20 Doped detail from 18

What is claimed is:

1. A method for designating a component (10) coated with a heat insulation layer (16) comprising zirconium dioxide ($ZrO_2$) stabilized with yttrium oxide ($Y_2O_3$) [YSZ] and for determining its operating time or operating temperature, the method comprising:

doping the heat insulation layer (16);
marking the doped heat insulation layer, with at least one metal oxide in at least one surface region of the component (10), the metal oxide being selected such that the doped region of YSZ is visible or can be made optically visible in order to designate the component (10), and
comparing a slower or faster change in lattice parameters of the doped YSZ region, as compared with undoped YSZ, and;
determining the operating time of the component (10) under temperature by comparing the lattice parameters with a known calibrating characteristic curve.

2. The method as claimed in claim 1, wherein the heat insulation layer (16) is colored locally by doping with a suitable metal oxide in order to make the designation of the component (10) visible.

3. The method as claimed in claim 2, wherein the coloring metal oxide is hematite ($Fe_2O_3$).

4. The method as claimed in claim 1, wherein the heat insulation layer (16) is doped with at least one alkaline-earth metal oxide, in particular with at least one of magnesium oxide (MgO) or calcium oxide (CaO), for a faster change in the lattice parameters of the doped YSZ, as compared with undoped YSZ.

5. The method as claimed in claim 1, wherein the heat insulation layer (10) is doped with at least one rare-earth metal oxide, in particular with at least one of ytterbium oxide ($Yb_2O_3$) or gadolinium oxide ($Gd_2O_3$), for a slower change in the lattice parameters of the doped YSZ, as compared with undoped YSZ.

6. The method as claimed in claim 1, wherein, to characterize the component (10) without a change in the lattice parameters of YSZ, as compared with undoped YSZ, the heat insulation layer (10) is doped with at least one metal oxide stable under high temperature, in particular with at least one metal oxide selected from the group consisting of $Fe_2O_3$, $Cr_2O_3$, $Al_2O_3$, NiO and CoO.

7. The method as claimed in claim 6, further comprising doping the heat insulation layer (10) additionally with a high-melting oxidation-resistant metal, in particular with platinum (Pt) and/or rhenium (Re).

8. The method as claimed in claim 7, wherein the sum of the concentrations of all the dopings is 0.0001 to 5% by weight, in particular 0.01 to 2% by weight.

9. The method as claimed in claim 8, wherein the dopings are limited locally and are formed as a pattern.

10. The method as claimed in claim 7, wherein the dopings are added to the initial material for the heat insulation layer (16).

11. The method as claimed in claim 7, wherein the dopings take place by infiltration.

12. The method as claimed in claim 7, wherein the dopings are generated by a conversion reaction within the heat insulation layer (16).

* * * * *